United States Patent [19]

Smith

[11] 4,106,235

[45] Aug. 15, 1978

[54] HORTICULTURAL IMPROVEMENTS

[76] Inventor: Walton J. Smith, P.O. Box 461, Wilton, Conn. 06897

[21] Appl. No.: 835,809

[22] Filed: Sep. 22, 1977

Related U.S. Application Data

[63] Continuation of Ser. No. 712,806, Aug. 9, 1976, abandoned, which is a continuation of Ser. No. 571,853, Apr. 25, 1975, abandoned, which is a continuation of Ser. No. 184,234, Sep. 27, 1971, abandoned, which is a continuation of Ser. No. 850,121, Aug. 11, 1969, abandoned.

[51] Int. Cl.² .............................................. A01G 31/00
[52] U.S. Cl. .......................................... 47/59; 47/66; 47/73; 47/79
[58] Field of Search .......................... 47/59, 66, 73, 79

[56] References Cited

U.S. PATENT DOCUMENTS 2,713,749  7/1955  Hult ......................................... 47/59

FOREIGN PATENT DOCUMENTS 1,080,204  12/1954  France ..................................... 47/59
284,290  11/1952  Switzerland ............................. 47/59

OTHER PUBLICATIONS

Soilles Growth of Plants, Ellis & Swaney, 1947, Reinhold Pub. Co., pp. 58, 59, 227, 229, 230 cited.
Advanced Guide to Hydroponics, Douglas, 1976, Drake Publishers Inc., N.Y., pp. 47-48, 101, 104-106, 140 cited.

Primary Examiner—Robert E. Bagwill
Attorney, Agent, or Firm—Larson, Taylor and Hinds

[57] ABSTRACT

A novel planter which facilitates watering of a plant over extended periods, and also facilitates transplanting of the plant with little or no shock.

2 Claims, 2 Drawing Figures

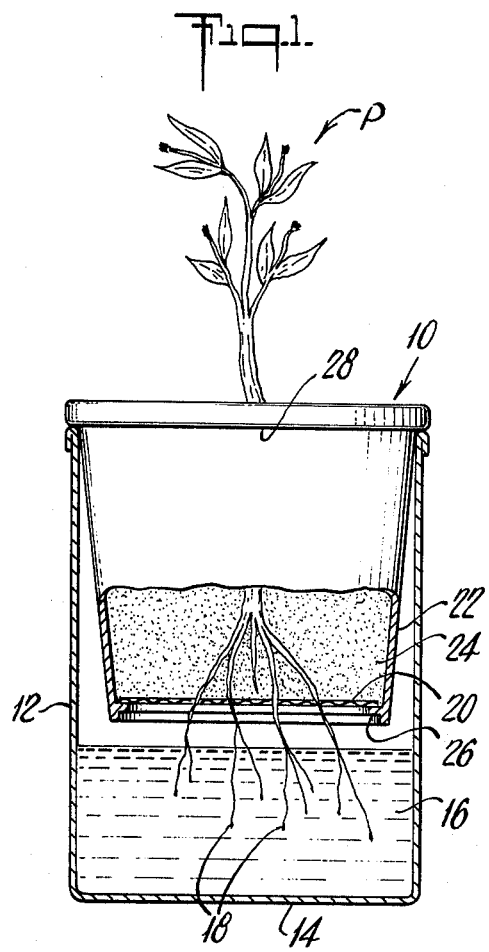
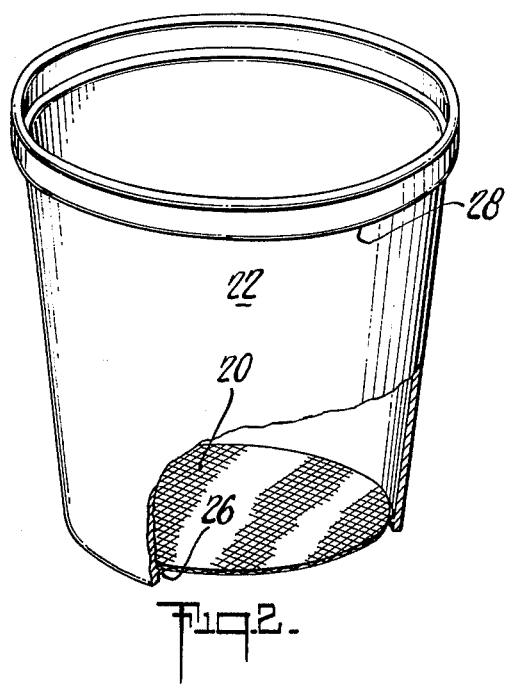

HORTICULTURAL IMPROVEMENTS

This is a continuation of Ser. No. 712,806, filed Aug. 9, 1976; which was a continuation of Ser. No. 571,853, filed Apr. 25, 1975; which was a continuation of Ser. No. 184,234, filed Sep. 27, 1971; which was a continuation of Ser. No. 850,121, filed Aug. 11, 1969, all abandoned.

This invention pertains to methods and products for growing plants indoors and outdoors. It pertains more specifically to flower pots and planters for growing plants. This invention is particularly concerned with portable plants for decorative or exhibition purposes.

In contrast to previously available flower pots and planters, the flower pot of the instant invention is employed to permit the growth of a plant of much greater size than has previously been possible from a small flower pot. This is accomplished by a system which permits the root system to grow substantially beyond the pot itself, and the resultant abundant root system outside the pot is able to provide water and other nutrients at a greater rate than would oterwise be possible. Other advantages will be described later.

Heretofore, portable flower pots have restricted root systems to the pot itself. This has resulted in limited root systems under which conditions of inadequate moisture and heat stress could not maintain the plant in a health condition. Small plants, such as are sold in florists shops, variety stores, and supermarkets, are usually contained in two or three inch diameter flower pots. The root system in small pots of this type, while it may be extensive in the small volume of the flower pot, can not handle the water supply problem as the plant grows to a larger size. Because the pot volume is so small, the plant must be watered often daily to keep the plant alive. This is not economical in most stores, and many of the plants deteriorate before they are sold. When even a healthy plant is purchased in a small pot, the owner must attend the plant daily to keep it alive, and if for one reason or another the plant is not watered for a long period, the plant will die. With proper care and frequent watering, a plant purchased in small pots as have heretofore been available, after it has experienced some growth and the root system fills the pot, must eventually be repotted. This repotting operation is a nuisance to some people and it often can not be done successfully by the inexperienced homemaker.

Heretofore, when one has wished to transplant a plant from its existing small pot to the ground outdoors, it has been necessary to remove the plant from the pot. This is not easy to accomplish by the inexperienced gardener because the plant is often held firmly in the pot and in its removal, the roots and the material holding the roots is often disturbed resulting in damage to the plant during the transplanting process.

The flower pot of this invention has, to a large extent, fulfilled the increasing requirements of longer life, less attention to watering, more economical marketing, faster growth, increased case of transplanting, along with other advantages which will be discussed.

SUMMARY OF THE INVENTION

Briefly stated, this invention resides in the discovery that a substantially larger and more extensive root system may be developed in a shorter time when the bottom of a flower pot is sufficiently open and the flower pot is resting tightly in a lower vessel containing water, the roots growing rapidly down into the liquid, eventually surpassing in size and capacity the root system in the flower pot itself.

For decades, and probably centuries, house plants have been grown in clay pots which have a small hole in the bottom usually closed with a rock or piece of broken clay pot. The pot is filled with soil or a mixture of soil and other growing media. The bottom hole is almost totally closed so that the soil or fine particulate matter does not pass through it during the watering process. This often results in poor drainage and inadequate aeration, both of which are the most frequent causes of failure to have a healthy plant.

Flower pots of all types including the clay pots usually are placed in shallow trays. Any excess water during the watering of the plant runs into the tray. If the plant is not overwatered or watersoaked and if aeration is adequate, and the plant grows, eventually some roots may creep out of the hole in the bottom despite its almost complete closure. This occurs, in general, only when the plant is "root-bound" which refers to the fact that the roots more or less fill the pot and now are looking for further growing space. When the holes in the bottom of pots are closed in this way, roots do not usually pass through the hole unless, as stated, the pot is "root-bound."

I have discovered that if I remove most of the bottom from a flower pot leaving just enough of the bottom to support a screen, many unforseen advantages result. Screens have not previously been used in growing ordinary house plants because it would have been expected that soil or other fine particulate matter would not be retained by the screen. I have discovered that I can use ordinary window screen for this purpose (plastic or preferably aluminum) and that soil mixtures frequently used for growing house plants or other potting mixtures are adequately retained on the screen despite the fact that the openings in the screen are much larger than the particulate matter in the soil or mixture.

One major advantage of the use of a screen on the bottom in these micro-sized and macro-sided pots is the superior drainage, and almost of equal significance is the superior aeration of the roots when grown using the vessel below the pot containing fluid.

These discoveries could not have been anticipated for a variety of reasons. As stated above, overwatering and underwatering are the major causes of failure with house plants. When the roots in the lower vessel are immersed in water, one would have to consider the possibility and even probability that it would "drown" the plant. Further, one would have to give consideration to the strong possibility that when the upper vessel is not "watered" for an extended period, even though the lower roots might be in water, the plant would die. On the contrary, I have discovered that in a wide variety of plants, if not all, the contents of the upper vessel need not be watered at all in some seasons. Another unpredictable finding was that, even though the porosity of window screen is smaller than the root system of many plants, most of these plants have no difficulty in extending their root growth through aluminum window screen.

It is a principal object of this invention to provide a portable flower pot and planter which enables the growth of a substantial root system beyond the upper flower pot itself.

It is an object of this invention to provide a portable flower pot and planter which requires infrequent watering.

It is a further object of this invention to provide a portable flower pot and contained plant which can be moved for display purposes or for other reasons to other lower containers without disturbing the plant in its pot.

It is an object of this invention to provide a portable flower pot and planter which provides a relatively constant source of liquid for an extended period by a simple, inexpensive means.

It is an object of this invention to provide a portable flower pot and plant which permits the removal of the plant from the pot for transplanting by pushing up on a screen resting on the bottom of the pot.

It is a further object of this invention to provide a portable flower pot containing a plant which may be planted in the ground without removal from the flower pot, the roots having already penetrated beyond the bottom of the flower pot through a screen.

It is a further object of this invention to provide a portable flower pot of small size which may be used in multiples in larger planters so constructed as to hold several smaller pots yet with a single liquid reservoir below into which the roots extend.

It is an important feature of this invention to provide a system for the economical and fast growth of portable plants for storage and sale in variety stores, florists, supermarkets, and the like. One feature of this invention is that nutrient solutions may be used to promote the growth of the plant by feeding from the bottom or from the top or both as desired.

DETAILED DESCRIPTION OR THE PREFERRED EMBODIMENTS

Upper Flower Pot

This invention can be described in greater detail by considering separately the following factors relative to the flower pot:
(a) composition of screen
(b) degree of openness of screen
(c) porousity of screen
(d) differentiation with prior art
(e) composition of growing medium

Composition of the Screen

The screen may be integrated into the bottom of plastic pots, although the preferred form is a screen which is removable. With an upward push from the bottom, the plant may be removed for transplanting without damage to the root system or disturbing the growing medium. While this is no problem to professionals, amateur gardeners would benefit from the advantage of a removable screen.

I have used aluminum screens primarily, though for experimental work I have also used stainless steel screens. Ordinary aluminum screen is the less preferred form because it has a tendency to corrode and probably has some toxicity to the roots, while aluminum screen as is used for window screen is treated in such a way that it resists corrosion and this is the preferred type of removable screen. Plastic is very satisfactory also if the desired degree of openness can be achieved along with proper rigidity of the bottom.

Degree of Openness of Screen

Since even the old-fashioned clay pots in which the hole is covered with a rock has a very small degree of openness, probably less than 1% of the area of the top of the pot, this invention is partly founded on a very significant increase in openness as compared with pots of the prior art.

One of the requirements of this invention is that the screen be essentially open. Ideally, it should be 100% open, but this is not practical since the wires or plastic will occupy some of the space. Other pots described in the prior art have had multiple holes in the bottom of the pot to improve drainage, however, these have not provided the degree of openness required by this invention. The open area prior to putting in soil or other supporting media should be at least 35% of the cross-sectional area at the rim of the flower pot, but I prefer to have the open area as high as possible, usually about 75% of the rim area.

This degree of openness is very important in encouraging the roots to pass through the screen as soon as possible rather than waiting until the plant is root bound.

Porousity of Screen

In the first place the screen should have adequate porousity so that prior to adding the particulate matter, the open area should be at least 35% of the cross-sectional area at the rim of the flower pot. If the bottom is an integral part of the pot which is formed when the flower pot is formed, the ribs or "wires" should be as small as possible to achieve maximum openness. Aluminum window screen has 18 openings to the inch or about 324 openings to the square inch. While not generally preferred for all plants, one could use 36 openings to the inch or about 1300 openings to the square inch. On the larger size openings, I have used aluminum screen with ⅛ openings or about 64 openings per square inch. It should be stressed that in most cases, the degree of openness is the same and the only thing that has been varied in the above discussion has been the size of the openings.

When integrating the bottom screen into the plastic pot, as a practical matter, some sacrifice in the degree of openness is usually made, but in any case, the total open area should be at least 35% of the top area as stated above. The openings would range from about 1/36 inch across to about 150 inch across if the openings are uniform.

Differentiation with Prior Art

This refers to the use of a "screen." The main differentiation is that while previous examples of pots with a plurality of openings have been concerned with better drainage, they have not provided the combination of drainage and aeration, along with a degree of openness which I have specified. The openness is previously described pots is not nearly adequate for the development of root growth below the pot as described in this specification.

With the present invention, it is desired to obtain root growth down through the screen as soon as possible, so that one need not wait for the plant to be root-bound for this to occur, and in many cases the primary root will head right down through the bottom of the pot as fast as it can grow. In the case of cucumber plants, for example, grown in 3 inch pots in the incubator at 85° F. using the aluminum window screen and a standard "soil" mixture, I have obtained root growth down through the screen within four days. With the pots previously described in the patent literature and elsewhere, this would not have been possible. It will be seen in the description of the use of these "open-bottom" pots with lower vessels containing water, that this feature is of greatest importance.

The patent literature describes a variety of pots with complicated structures, even wires on the bottom to hold pebbles, but none of these would enable the use of typical mixtures used in potting house plants, and at the same time provide maximum aeration and drainage along with the encouragement of root growth beyond the bottom of the pot.

In hydroponics, a screen has been employed, but it has been of extremely wide mesh, namely chicken wire, which in turn holds some excelsior or the like, hence the true bottom is not really the chicken wire but rather the excelsior. Also in the use of fine particulate matter as the growing medium, one could not use the type of upper container used in hydroponics.

An unpredictable discovery with the use of aluminum window screen has been that roots grow down through the screen with diameters much greater than the screen itself. In other words, the screen can be of small enough porosity that normal potting mixtures can be used without significant loss during watering, yet roots of virtually any size can penetrate the screen. Although one would expect that the maximum root size could be 150 inch through such a screen, I have observed roots with a diameter of up to 150 inch and even larger penetrating such a screen. Obviously, the prior art in which holes have been bored in plastic or molded in plastic, would not offer this option, nor would the root in most cases even be able to find the sparse holes.

Composition of the Growing Medium

The use of potting mixtures has been described above. This invention resides partially in the finding that fine particulate matter, of which soil may be a component, builds itself up at the small openings of window screen so as to permit a free flow of water and air, yet does not significantly pass through the openings upon watering despite the fact that the particulate matter can be much smaller than the openings. This fine particulate matter may include vermlculite, soil, fine sand, pearlite, lime, humus, and the like.

The flower pot, or upper vessel of this invention, provides for a flower pot which is essentially open at the bottom in the form of a grid or a screen, said bottom prior to adding the growing medium being at least 35% open and preferably at least 75% open, said grid or screen having openings at least 1/36 inch and smaller than about 150 inch in the largest dimensions. While certain prior art may have a fraction of these embodiments, they do not provide or suggest the composite consisting of providing a satisfactory degree of openness of the screen, the proper porosity of the screen, nor composition of the screen, nor enabling the use of fine particulate matter as the growing medium, all of which characteristics fulfill the requirements for enhancing the rate of growth of roots through the bottom of the pot.

The flower pot need not be completely solid on the sides, but the sides may be partially open and made of a similar grid or screen as the bottom. This permits the roots to grow out of the sides as well as the bottom when it is immersed in a lower container with adequate space on the sides. The sides and the bottom may consist only of a screen with a rim, made of suitable material to hold the screen from falling into its support vessel.

Flower Pot Combined With Lower Vessel

If a conventional flower pot with a live plant is kept in a pan containing water, in most cases the plant will die from "drowning." Many hobbyists have trouble keeping houseplants alive for this reason. Either they forget to water the plant and it dies from lack of water, or they overwater it and it dies by "drowning." This difficulty has been overcome to a degree by a variety of inventors. One such invention is that of Schein (U.S. Pat. No. 1,533,342) in which a flower pot has drainage holes to provide maximum drainage, and the flower pot rests on a pan containing water so constructed that the water level can not rise above the bottom of the flower pot, of the hundreds of devices described to provide better aeration, drainage, and more uniform watering, none provides a system for enlarging the root system beyond the flower pot itself. In the case of the flower-pot of Schein, if the roots did penetrate the small number of holes in the bottom of the pot, the holes would be clogged and negate the object of his invention which was to provide superior drainage and aeration.

If a conventional flower pot with a live plant were inserted tightly in a container which prevented the pot from falling through into the container, and if water were put in the lower container so as not to cover the bottom of the pot, adequate drainage would result along with some other advantages, but the root system would not have an opportunity to expand to any substantial degree into the liquid below because the opening in such pots (after closing to prevent loss of soil) is too minute for any significant root growth to develop beyond the pot.

I have discovered that if I remove most of the bottom of conventional plastic flower pots and cover the bottom with aluminum screen such as is used on windows, by the use of a little fine particulate material material covering the bottom of the screen such as vermiculite, the pot will retain soil or any other convenient growing medium. In fact, when standard potting mixtures such as are purchased in stores is used without vermiculite on the bottom, there is little if any loss of the soil portion when the mixture is watered. When such a pot is inserted tightly in a container such as an aluminum can, the plant's roots will grow into liquid below, and eventually the root system outside the pot will often exceed those inside the pot. When it is desired to transplant such a plant outdoors in the ground, by a simple push upward on the screen upward, the plant and its roots can be removed without disturbing the contents of the pot. The plant is then planted, often leaving the screen with the roots in the soil, and the resulant plant will enjoy a superior growth rate as a result of the larger root system and as a result of lack of disturbance of the root system in the pot portion.

As stated above, I have discovered that many plants will survive for several weeks without additional water in the flower pot itself even though the contents of the upper pot are essentially "bone dry," as long as the roots below the pot are partially immersed in liquid. The roots themselves in some cases act as wicks and will maintain a moist condition in the upper vessel even though no liquid is added to it. This is particularly true of african violets, but is dependent on the humidity of the air in the room, etc. Thus, in the wintertime when the air is very dry indoors, the contents of the upper vessel may become "bone dry" yet the plant will survive lack of attention. The flower pot of Schein, as an example, would not be adequate to keep a plant alive under such conditions without additional watering of the upper vessel, though admittedly, it would be better than a conventional flower pot under dry conditions for short periods, especially for larger size pots.

When I have shown this invention to some horticulturists, they usually take the view that this type of "gadget" has limited application since "most plants would die with their roots immersed." This attitude results from years of experience in which it has been shown that the roots if immersed will indeed result in death for the plant, and the roots will rot. The fact that I have found that virtually all plants may be grown using the technique of my invention is an exciting discovery but it also demonstrates the unpredictability of this invention.

In the accompanying drawings, this invention has been illustrated with certain preferred embodiments.

FIG. 1 illustrates the complete assembly showing a plant in the flower pot which is resting in a lower vessel containing water or nutrient liquid.

FIG. 2 is a study of the flower pot itself.

FIG. 1 shows a cross-section in which the flower pot, 22, is resting in the lower vessel, 12, held tightly in place by the rim, 28, which is such a dimension that it is larger than the inside dimension 12. The bottom of the flower pot, 22, is open except for a rim, 26, extending so that a screen, 20, may cover the bottom without falling through. The plant, P, as it develops forms a root system, 18, which develops not only in the flower pot itself but passes through the screen, 20, into a nutrient liquid, 16. The flower pot contains a medium, 24, which can be fine particulate matter, which holds the plant upright and may supply nutritive elements as well.

I have used high impact polystyrene to a great extent for the pots in performing this invention, however, other materials which are non-toxic to the plants are also suitable. This is especially true, when the flower pot is suspended mostly in the lower vessel as shown in the illustration.

The lower vessel may also be made of a variety of materials. I have used aluminum, glass, plastics such as polystyrene, and coated steel cans. The diameter of the rim of the upper pot, 22, should be comparable to the diameter of the lower vessel, 12, so that sufficiently tight fit is obtained that water vapor is not lost.

The rim, 28, in the illustrations is shown to be quite narrow, and this is the preferred embodiment in the use of this invention for many types of plants, particularly those which grow tall and to substantial sizes (geraniums and the like). By means of the narrow rim and the resulting suspension of the pot into the lower vessel, there results an increased stability of the unit, and there is less chance for the plant to tip and fall over. For plants like african violets and baby tears, since they do not grow tall, a greater amount of the pot may extend above the top of the vessel.

The support, 26, for the screen for small pots may be as illustrated. When this invention is incorporated into larger (macro-sized and larger), I prefer to use two reinforcing ribs which cross. This offers the advantage that the molten plastic may be fed at the point of crossing, facilitating in the manufacture of the pot, but its principal feature is its support of the removable screen which might otherwise permit the plant and the contents of the upper pot to fall through into the liquid in the lower vessel.

The preferred form of the pot for this invention has a removable screen. This is preferred so as to permit a maximum open area on the bottom of the pot since wire screen can be made with very small diameter wire, and a smaller area is occupied by the wire itself. It is also considered to be a major advantage of this invention that by an upward pressure on the screen, as stated earlier, the plant may be removed for transplanting with a minimum of damage to the roots in the pots and the potting medium. Although an integral bottom would not fulfill this objective, it is possible to manufacture a pot within the scope of this invention with an integral-screened bottom, though at this time it is not the preferred embodiment. In this latter instance, a screen bottom made of plastic is contrasted with a few perforations or holes which would not open the bottom to achieve most of the objectives of this invention.

The pot and planter described herein differs from commercial hydroponic culture in a variety of ways, among others in the portability and interchangeability of the pots and planters, and the easily removable bottom. A plant may be grown in a commercial greenhouse using this invention and marketed in the identical container in which it is grown. Because of the possibility of the interchangeability of the vessels, the plant may be grown commercially in an inexpensive lower vessel, but marketed in an elaborate and decorated lower planter, thus permitting a low growing cost but greater saleability at point of sale. Further, as will be described later, much of the growth of the plant may be made in the greenhouse even without the lower vessel. Further, the plant may be transported from the greenhouse to the retailer with a very inexpensive lower vessel, such as a paper cup protecting the roots in transit.

This invention differs still further from commercial hydroponic culture in that plants may be grown in a first phase in the traditional method in soil in a vessel with the screen bottom, 20. In the second phase, the plant may be allowed to develop roots into a lower vessel, which may or may not contain nutrient solution other than water. The advantage of this procedure is the case of commercial use in shifting from their present method of producing houseplants to this new method, only by the use of a different flower pot, but otherwise keeping the procedures the same. The upper pot may contain soil and other growing media, and especially in the first phase bears no relationship to hydroponic growth.

This invention differs still further from commercial hydroponic culture in that the upper vessel may dip into the lower watercontaining vessel almost to the water surface (as in FIG. 1), yet have considerable air space saturated with water vapor and containing considerable oxygen. This is accomplished by the use of lower vessels whose sides have a larger diameter than the opening at the top, 28.

As has been stated earlier, there is no connection between hydroponic culture and the invention described herein. Growers of house plants have no association with hydroponic growers. The latter use this method where there is inadequate soil, and their efforts are largely devoted to growing vegetables and flowers where the entire plant is never sold or transported, but only the fruits or flowers are sold. Thus, for this and other reasons, knowledge of the existence of hydroponics does not suggest the instant invention.

The flower pot, 22, has shown in the illustration is traditional is shape except for the height of the rim. I have found advantages for certain plants for another shape for the upper vessel or flower pot, and this is one in which the opening at the top, 28, is smaller than the diameter at the bottom, 26. I have discovered that the advantage of such a construction is that small plants may be started in larger pots without transplanting because the roots grow downward utilizing the entire pot. In the traditional pot, the root growth expands downward, but the pot narrows to decrease the growing space. The old design has forced growers to start plants in very small pots requiring frequent transplanting. This new concept is applicable to all kinds of flower pots and is not limited to the principal objectives of this invention, though it does have applications in utilizing the invention described herein.

The flower pots and planters utilizing this invention may be of different shapes and cross-sections. A round cross-section has been shown in FIG. 1, but any convenient shape may be used which provides for a tight closure with the lower vessel, which in turn may be of any desired shape.

One very interesting and valuable advantage of planters employing this invention is the possibility of many combinations of upper vessels and lower ones. As long as they are interchangeable, many different combinations are possible, including lower vessels with very large liquid capacities, though the top portion, 28, may be quite small.

It is important to note that as a result of the interchangeability discussed above, a plant in effect may be transplanted, without the slightest disturbance of the root system or contents of the flower pot, simply by lifting the flower pot portion and transferring to a larger lower vessel but which has the same dimensions at the rim, 28.

An additional advantage as has been mentioned previously is its use in multiple plantings, both indoors and outdoors. In the case of window boxes, a closure on the top of the box (capable of holding water) has one or more holes of proper shape and size so that the upper vessel or flower pot can be inserted and will not fall through, at the same time making a fairly complete closure to prevent loss of water vapor. This same technique can be applied to all containers which hold water and which otherwise would be too large to accommodate the flower pot. Plants grown outside in window boxes when in flower may be brought inside and put in other lower vessels for maximum display without disturbing the root system, and they may be returned to the window box outdoors when its purpose indoors has been served.

EXAMPLE 1.

The 3 inch diameter (at top) flower pot in FIG. 2 is filled with vermiculite to about 1 inch from the top. Three cucumber seeds are placed on top and the vermiculite wetted with liquid nutrient solution containing nutrients normally used in liquid fertilizers. About one-quarter inch of vermiculite is placed on top, and the top of the pot is covered with transparent food wrap fastened with a rubber band. The flower pot is then placed in a planter consisting of a "tin" can whose dimensions are such that the rim of the flower pot rests firmly on the top of the can. In the can is placed enough nutrient solution so that the bottom of the flower pot almost touches it. The planter and pot are put in an incubator at 85° F. for three days in the darkness. At the end of this period, the seed has germinated and some roots are beginning to extend from the screen, 20, on the bottom of the flower pot. The transparent covering is removed, and the plant is placed in the light at room temperature. At the end of another week, the roots will have grown into the liquid. During the early growing phase, the vermiculite in the flower pot is kept moist by watering about once every three or four days, but as the plant develops, watering is required no oftener than once a week, and the upper pot need not be watered often if the liquid level in the lower vessel is covering the lower root system in the lower vessel as shown in FIG. 1, 18.

EXAMPLE 2

A geranium cutting which has begun to form roots in a rooting liquid is planted in the flower pot shown in FIGS. 1 and 2. A small amount of vermiculite is placed on the screen, and the cutting is then surrounded by a mixture of soil, vermiculite and peat moss. The upper vessel is watered, and the liquid level in the lower vessel is adjusted so that it is about a quarter inch from the bottom of the upper vessel. Within a week, roots are seen penetrating the screen, and in another week they are partially covered by the liquid 16. After a month, the root system in the lower vessel exceeds those in the upper vessel.

EXAMPLE 3.

Two squash seeds are substituted for the cucumber seeds in Example 1.

At the end of three weeks, the root system has developed into the lower vessel to such an extent and the plant has grown so extensively that the plant consumes more than 200 ccs of water daily. The plant is then picked up and removed from the lower vessel and placed in a window box containing nutrient liquid, and which is covered with plywood in which a hole has been cut with the same diameter of opening as the can in which it was growing previously. The level of the liquid in the planter is somewhat lower than the bottom of the flower pot. The squash plants grow rapidly, eventually flowering, and eventually forming normal squash. The liquid consumption on warm days approaches a half gallon daily, and the root system is enormous, all of which has been accomplished in the original pot with a 3 inch diameter.

While the above limited description has been given to illustrate this invention, it will be apparent to those skilled in the art that variations and modifications of this invention can be made and that equivalents can be substituted therefor without departing from the principles and true spirit of this invention.

I claim:

1. A portable planter for house plants comprising an upper plant holder means received in a lower vessel containing water for the plant such that the lower vessel is effectively closed to prevent loss of water vapor, the water level being below the bottom of the plant holder means, the bottom of said plant holder means including a support means comprising crossing reinforcing ribs supporting a removable aluminum window screen, said bottom being at least 34% open and holding fine particulate plant-supporting material at least directly on said screen and accomodating a substantial root system, said screen having openings at least 1/36 inch and smaller than about 150 inch in the largest dimensions.

2. A method of cultivating plants comprising a first stage of growing the plant in a pot, the bottom of said pot including a support means comprising crossing reinforcing ribs supporting a removable aluminum window screen, said bottom being at least 35% open but capable of holding fine particulate plant-supporting material directly on said screen and accomodating a substantial root system, said screen having openings at least 1/36 inch and smaller than about 150 inch in the largest dimensions, continuing said first stage growth until the roots pass through the mesh of said screen into the water of said lower vessel, removing said plant by raising said screen and the plant from the upper vessel and transplanting the same into a new growth medium.

* * * * *